United States Patent [19]
Hines

[11] Patent Number: 6,034,782
[45] Date of Patent: Mar. 7, 2000

[54] ADAPTIVE COMPRESSION FOR PRINTER I/O CHANNEL

[75] Inventor: Steven K. Hines, San Diego, Calif.

[73] Assignee: Hewlett-Packard Company, Palo Alto, Calif.

[21] Appl. No.: 08/918,776

[22] Filed: Aug. 25, 1997

[51] Int. Cl.[7] .................................................. G06F 1/00
[52] U.S. Cl. .................. 358/1.14; 358/261.1; 358/261.2; 358/261.4; 345/118; 348/180; 348/404; 348/384; 348/420; 348/441; 348/596; 348/739
[58] Field of Search ............................. 345/118; 348/180, 348/404, 384, 420, 441, 596, 739; 347/43, 180; 358/261.1, 261.2, 261.4, 296, 298, 404, 430, 433, 444, 500–504; 395/101–102, 109–110, 112–117; 400/61–62, 70, 124.01, 124.04

[56] References Cited

U.S. PATENT DOCUMENTS

| | | | |
|---|---|---|---|
| 4,851,998 | 7/1989 | Hospodor | 364/300 |
| 5,519,438 | 5/1996 | Elliott et al. | 348/180 |
| 5,533,175 | 7/1996 | Lung et al. | 395/115 |
| 5,680,521 | 10/1997 | Pardo et al. | 395/112 |

*Primary Examiner*—Mark R. Powell
*Assistant Examiner*—Lance W. Sealey

[57] ABSTRACT

A cable test application is run in the host computer to determine whether the PC to printer connection is able to maintain at least a predetermined speed of data transfer. The cable test provides an accurate measure of the true throughput of the I/O connection during a print job, for example by sending special blocks of data, each tagged so that it is recognizable by the printer firmware's formatter as a "speed test block" that may be discarded after it has been processed, not only by the printer firmware's I/O process, but also by the downstream formatter process. This provides a more accurate measure of data transmission speed than simply having the I/O process throw away not yet formatted test data, and does not require the waste or spoilage of any print media or other expendable supplies. If the cable test indicates that the data transmission speed is not adequate to guarantee that a print job will always arrive in the time required (for example, because an ECP port's advanced capabilities have not been enabled), the data is preferably compressed before transmission to a level sufficient to accommodate the maximum design throughput of the printer. If the communication channel is not able to provide data transmission speed for which the printer was designed, the adverse consequences of the compression will be more than outweighed by the improvement throughput and the avoidance of artifacts caused by erratic carriage motion resulting from erratic receipt of data.

8 Claims, 2 Drawing Sheets

ADAPTIVE COMPRESSION FOR PRINTER I/O CHANNEL

TECHNICAL FIELD

The invention relates generally to transfer of data between a computer and a peripheral device, and more particularly to the use of a printer I/O channel in a manner that facilitates both print speed and print quality.

BACKGROUND

Personal computers typically communicate with a printer through a multiple conductor parallel cable with a dedicated hardware interface at each end. Depending on the make and model of the computer and how it has been configured by the user and/or by the various application programs installed by the user, the amount of data that can be transmitted over the parallel communication link will vary from less than 30 kBs (kilo-bytes per second) to well over 500 kBs. The effective communication rate will vary even more, depending on to what extent the data is compressed before transmission and whether the compression is performed on a timeshared basis by software resident in the computer, or by dedicated hardware resident in the interface.

Printers are typically designed for an optimal throughput rate, which in the case of a swath-oriented printer (such as a typical inkjet printer) is, primarily, a function of the traverse rate of the carriage across each swath and how many times the carriage is traversed across a single swath. Optimal printing quality and maximum throughput of an inkjet printer is achieved only when the carriage motion is effectively continuous and not interrupted because of a communications bottleneck between the computer and the printer. Accordingly, prior art printers were typically provided with sufficient memory to store an entire swath before it was printed. However, today's inkjet printers are able to print images whose resolution (pixel density) and palette (number of bits per pixel) approximates that of conventional color photography, thus rendering it rather expensive to store sufficient data in the printer to print an entire swath of a photographic quality image. At the same time, it is desirable that the newer photographic quality, high resolution printers be compatible with older and slower computers without requiring expensive hardware upgrades and additional memory.

Another complication in the quest for optimal speed and quality is that even if a computer is provided with the latest and fastest communications interface hardware (for example, an ECP ("Extended Capabilities Port") chip which implements powerful compression and error correction algorithms), the capabilities of such hardware cannot be fully exploited in an uncontrolled consumer environment without risking compatibility with existing "legacy" software and hardware that was designed, tested and released before the improved interface hardware had become generally available. As a consequence, many hardware manufacturers and software vendors normally disable the advanced settings of the computer's communication interface and do not guarantee their products will perform properly if those settings are subsequently enabled. Accordingly, any software which enables the ECP chip's advanced capabilities without the user's consent may cause the PC to crash or otherwise become unstable.

On the other hand, it is not feasible to involve the user in the reconfiguration of their ECP port, since there is no recognized industry standard for either the configuration settings or the software tools required to reconfigure a particular ECP port on a particular computer. Moreover, any attempt by an inexperienced user to reconfigure the port has a high probability of causing problems for the user's system.

SUMMARY

In accordance with the present invention, a cable test application is run in the host computer to determine whether the PC to printer connection is able to maintain at least a predetermined speed of data transfer.

Preferably, the cable test provides an accurate measure of the true throughput of the I/O connection during a print job. In one specific embodiment, this is accomplished by sending special blocks of data. Each block is tagged so that it is recognizable by the printer firmware's formatter as a "speed test block" that may be discarded after it has been processed, not only by the printer firmware's I/O process, but also by the downstream formatter process. This provides a more accurate measure of data transmission speed than simply having the I/O process throw away not yet formatted test data, and does not require the waste or spoilage of any print media or other expendable supplies.

If the cable test indicates that the data transmission speed is not adequate to guarantee that a print job will always arrive in the time required (for example, because the ECP port's advanced capabilities have not been enabled), the data is preferably compressed before transmission to a level sufficient to accommodate the maximum design throughput of the printer.

It will be recognized that substantial compression of image data will require additional processing and may result in some loss of image quality. However, if the communication channel is not able to provide data transmission speed for which the printer was designed, the adverse consequences of the compression will be more than outweighed by the improvement throughput and the avoidance of artifacts caused by erratic carriage motion resulting from erratic receipt of data.

DETAILED DESCRIPTION

Figure 1:
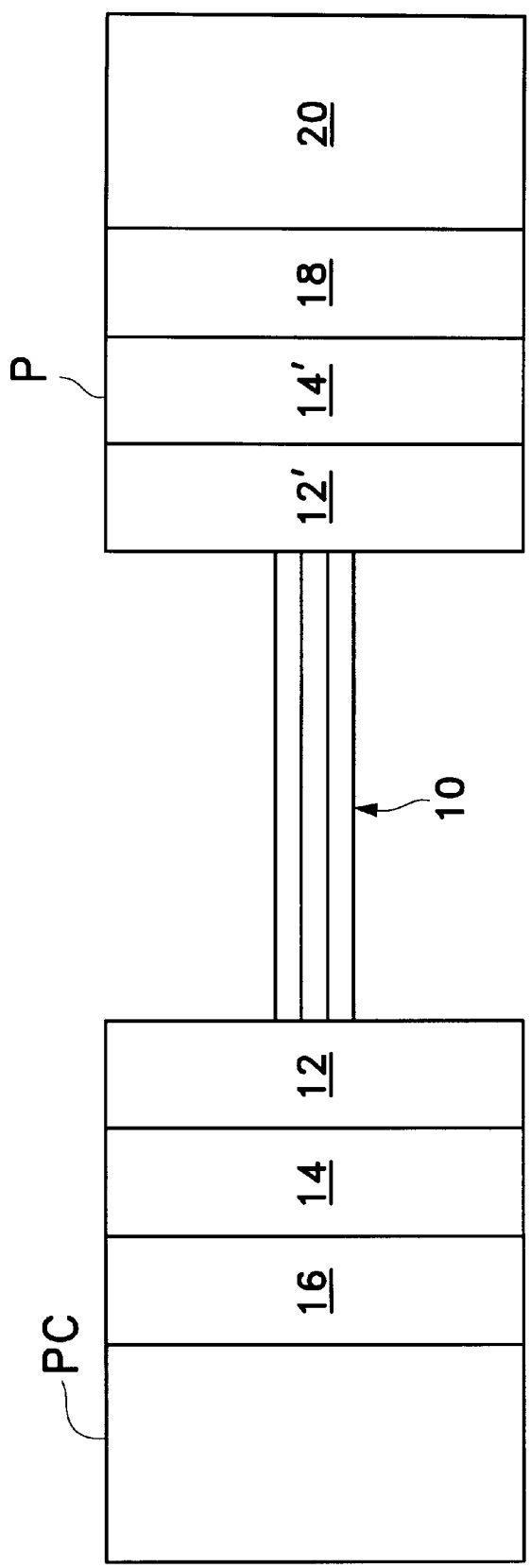
FIG. 1 is a block diagram of an exemplary prior art communication channel between a personal computer and a printer.

Referring to FIG. 1, it will be seen that a typical prior art computer PC communicates with an attached printer P via a multiple conductor parallel cable 10. Cable 10 is connected on the printer side by a first I/O port 12 (for example, an integrated circuit designed in conformance with the IEEE-1284 protocol specification) which in turn is connected (via a shared I/O bus) to a print buffer 14 that is part of a printer driver program 16 resident in the computer. Printer driver 16 also includes compression and formatting software for converting the data to be printed into a form compatible with the print buffer 14, I/O port 12 and the cable 10.

On the printer side of cable 10 is a second I/O port 12', a second buffer 14' and formatting firmware 18 that uncompresses the received data and converts it into a form compatible with the printer's internal logic 20. In the case of a swath-oriented serial printer such as an ink jet printer, logic 20 will typically include temporary storage for uncompressed pixel data that is about to be printed, as well as software or firmware responsive to the data for controlling the timing and speed of the carriage advance across each swath, the application of ink from individual nozzles of a ink cartridge supported on the carriage, and the feeding of the print medium though the printer, as well as various housekeeping functions such as monitoring the supply of ink and print media. Since an ink jet printer is typically a binary device which applies a single premeasured dot of ink to certain designated pixel locations on the print medium, special processing of the data may be required to print photographs and other images having many shades of grey and/or in which different colors of ink are mixed in many different proportions. In that case, either the printer logic 20 or the driver 16 may be programmed to convert the multilevel image data into a half tone image in which the number of individual pixels in a given area which are turned on (covered with a dot of ink) or off (no ink) is a function of the intensity of the corresponding portion of the original image. In order to avoid moire patterns and other artifacts, the half-tone process is typically performed in a pseudo random fashion using a predetermined dither matrix and/or an error diffusion algorithm to vary a threshold associated with each individual pixel. Because the blue noise added by such a pseudo random half-toning process adds to the complexity of the image data, it is preferable for the printer logic 20 to perform any required half-toning, for example by using a dither matrix and/or an error diffusion matrix that is downloaded from the printer driver 16 to the printer logic 20 via the I/O ports 12, 12' and the cable 14 when the printer is initialized. In that case the formatter 18 must be able to distinguish multi-level image data from the matrix used in the half-toning process, for example by means of an appropriate entry in the header of each block of data that specifies the size and nature of the associated block.

Figure 2:
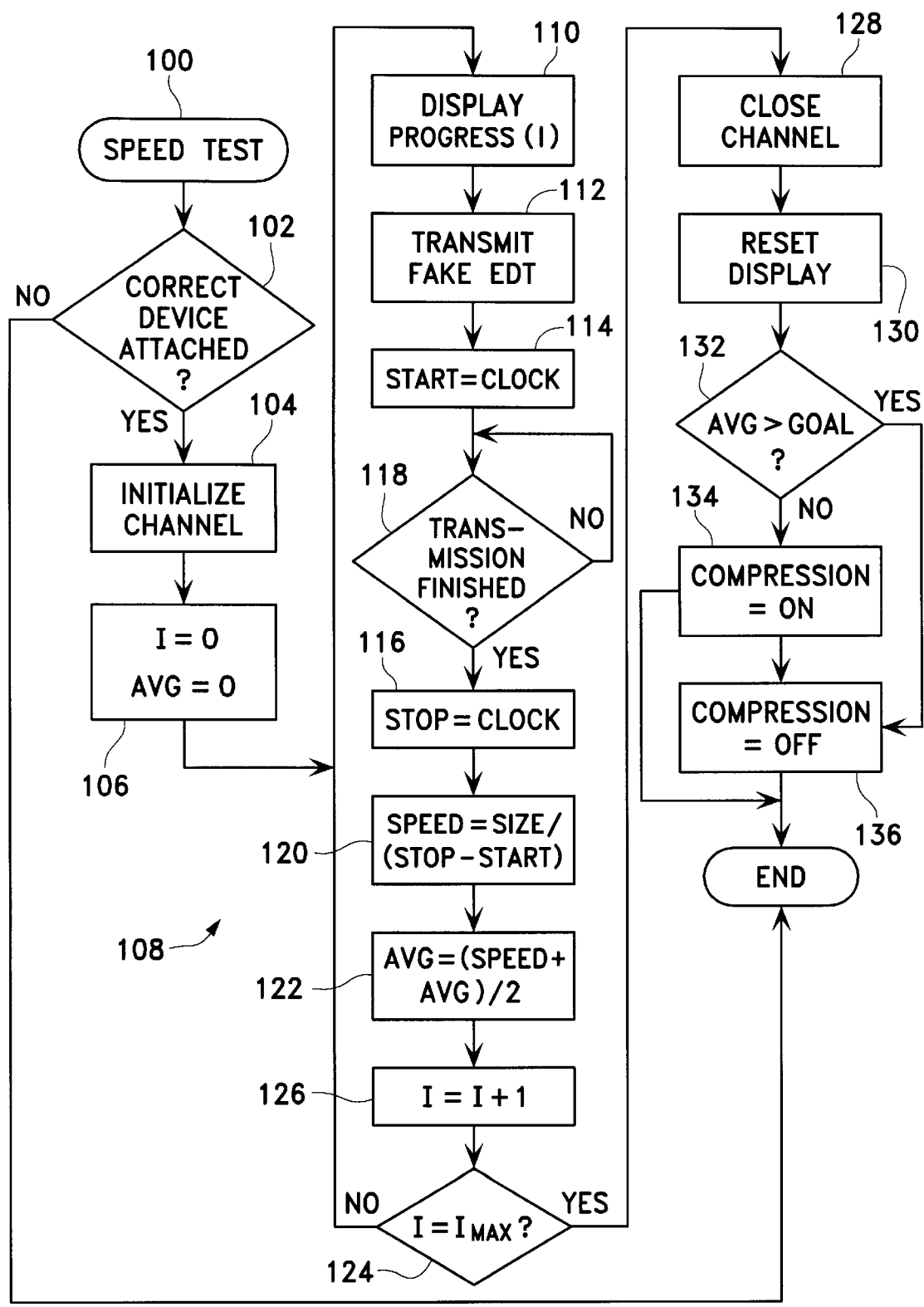
FIG. 2 Is a flow chart of a preferred embodiment of a cable test routine in accordance with the present invention.

Reference should now be made to FIG. 2, which is a flow chart of an exemplary implementation of a cable test routine in an inkjet printer which uses a downloaded error diffusion table to convert a multi-level image to a half-toned image. From entry point 100, a test 102 is made to determine whether the expected device (for example, a photographic quality inkjet printer) is actually connected. This may be done for example by transmitting an instruction to the remote device to respond with a "DeviceID" code embedded in the printer's firmware. If the DeviceID is appropriate, the communication channel is initialized by transmitting a command to the printer to enter printer data processing mode (block 104), pass counter I and interim weighted average register AVG are initialized (block 106), control passes to loop 108.

During each pass of loop 108, the current value of I is used to display progress to the user (block 110) and a "fake" error diffusion table is transmitted (block 110), which appears to be valid data to the printer's I/O port, data buffer, and formatter, but which is recognized as test data by the printer control logic and is therefore discarded. Although other types of data might also be appropriate, error diffusion table data has the desirable property of being sufficiently voluminous and random to serve as an effective test of the printer's ability to receive and format a large volume of data.

A clock is started (block 114) at the beginning of transmission and is stopped (block 116) after the entire table has been received and formatted (test 118). Since the difference between the two times is inversely proportional to the speed at which the data is processed in the printer, the speed of the current iteration is computed in block 120 and combined with the average speed from any prior iteration in block 122 to form a weighted average for the test. The process is preferably repeated for a number of times (IMAX, test 124), with the counter i being incremented (block 126) during each pass through the loop 108, with the progress indicator corresponding to the current value of i updated (block 110).

Once the required number of iterations has been reached (Yes branch from test 124), the channel is closed (block 228), thereby freeing the hardware to control other devices and/or to transmit other types of data, and the progress indicator is no longer displayed (block 130). At the same time, a compression flag is set in the printer driver indicating whether (test 132) the speed test was passed (no additional compression required, No branch to block 134) or the measured weighted average did not attain the design goal required to advance the printer carriage continuously at maximum speed, and data must be substantially compressed before transmission (Yes branch to block 136).

Although a specific presently preferred embodiment has been described, other variations will be apparent to those skilled in the art without departing from the spirt of the invention as set forth in the appended claims. For example, rather than merely turning the compression on and off, the printer driver can select different compression algorithms based on how much compression is required to achieve the desired transmission speed. As another example, some or all of the computations performed by the printer driver can be performed by the firmware inside the printer and the results transmitted back to the computer. As a third example, rather than performing the speed test only once using fake data during printer initialization, the transmission speed could be monitored at regular intervals, perhaps while real data was being transmitted and printed. Although adding additional complexity and requiring additional computational resources, monitoring the performance during actual operating conditions might determine if the original measurement was no longer representative of the data transmission rate that could be expected from the communication channel.

I claim:

1. A method of controlling a printer from a computer, comprising the steps:

establishing a communication link between the computer and the printer;

transmitting blocks of data including a predetermined block of data over the communication link from the computer to the printer, said transmitting step further including a data compression process;

processing the blocks of data including the predetermined data block after it has been received at the printer, said processing step further including a formatting process and a data decompression process;

measuring the time it takes for the predetermined block to be received and processed; and adaptively modifying the transmission of subsequent blocks of data from the computer if the measured time exceeds a predetermined threshold, by altering the data compression process to reduce the amount of data being transmitted over the communication link;

wherein the predetermined block of data is control data to be used by the printer for processing subsequent blocks of data.

2. The method of claim 1 wherein the measured time is converted into an average speed before it is compared to the threshold.

3. The method of claim 2 wherein the average speed is a weighted average of several measurements.

4. The method of claim 3 wherein the measurements are performed in the printer and communicated back to the computer over the communication link.

5. The method of claim 3 wherein the measurements are computed in the computer based on data transmitted from the printer.

6. The method of claim 3 wherein the weighted average accords a greater weight to a more recent measurement than to a less recent measurement.

7. The method of claim 1 wherein the predetermined block of data is in the form of an error diffusion table.

8. The method of claim 1 wherein:

the printer is a swath-oriented printer in which optimal printing quality and maximum throughput is achieved only when motion of a carriage is not interrupted because of a communications bottleneck between the printer and the computer; the printer does not have sufficient memory to store the data required to print an entire swath; the printer is used in an uncontrolled user environment having large variations of available bandwidth between the computer and the printer; and the predetermined block is transmitted only during an initialization process.

* * * * *